No. 705,691. Patented July 29, 1902.
W. J. MORTON.
METHOD OF DISPERSING FLUIDS.
(Application filed Feb. 20, 1900.)
(No Model.)
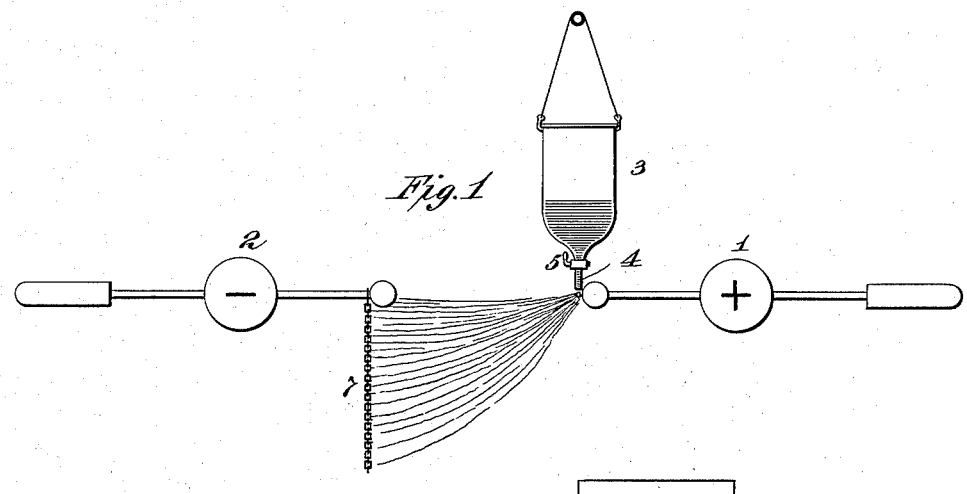
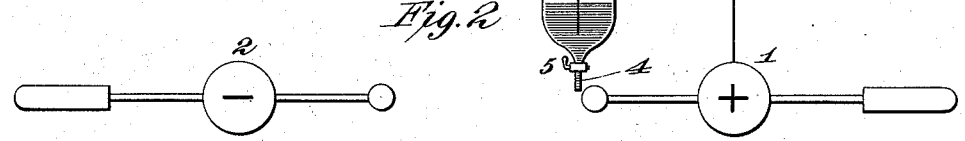
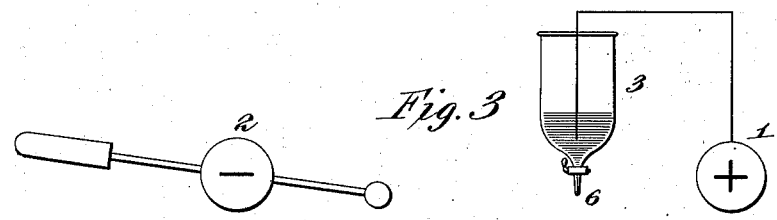
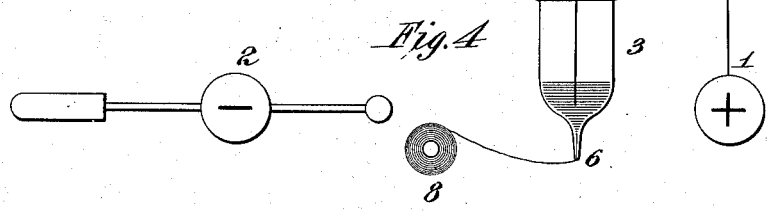
Witnesses:
Inventor
William James Morton
by Dyer Edmonds & Dyer
Attrys.

UNITED STATES PATENT OFFICE.

WILLIAM JAMES MORTON, OF NEW YORK, N. Y.

METHOD OF DISPERSING FLUIDS.

SPECIFICATION forming part of Letters Patent No. 705,691, dated July 29, 1902.

Application filed February 20, 1900. Serial No. 5,905. (No specimens.)

*To all whom it may concern:*

Be it known that I, WILLIAM JAMES MORTON, a citizen of the United States, residing in the borough of Manhattan, city of New York, State of New York, have invented a certain new and useful Method of Dispersing Fluids, of which the following is a description.

My invention in its broad scope relates to the electrical method of dispersing fluids, whereby volatile fluids are separated from their combination or association with relatively non-volatile or fixed substances in composite fluids composed thereof, resulting also in the evaporation of the volatile fluids and a state of condensation or solidification of the relatively non-volatile or fixed substances, whereby fiber may be artificially produced. Broadly speaking, the process is practiced by delivering the composite fluid in an attenuated form into an electrically-polarized atmospheric field produced by the convective passage through an atmospheric medium of an electric current of high tension. If a quantity of a composite fluid to be thus electrically dispersed and separated be delivered in a fine stream or streams or finely-divided state into a polarized atmospheric field or path of a convective discharge between the polar terminals of an active source of electricity of high tension, a separation of the volatile component from the fixed component occurs and contemporaneously the fixed component is broken up or disrupted, the volatile component is evaporated, and simultaneously the fixed component is condensed or solidified. When a viscous solution of a tenacious fixed substance capable of setting or hardening while in a filamentous state is delivered in the manner above mentioned to the convective discharge, the volatile component is separated from the fixed component, and coincident therewith the rapidly-condensing fixed component is broken up or disrupted into filaments by the action of the convective discharge, which are rapidly dried and solidified in a fibrous condition adapted to be used for textile or other purposes, according to the nature of the fixed component. It is preferable when employing heavy viscous composite fluids that the fluid upon which the process is to be practiced should be projected or delivered into the path or field of the convective discharge in an attenuated or finely-divided form. If the composite fluid is viscous and its non-volatile component is capable of setting or hardening upon being deprived of its solvent, such as collodion, and the electrical tension is properly graduated to the delivery of the fluid, then fine long filaments are produced by the electrical disruption of the fluid after delivery into the convective field, and the filaments of pyroxylin will dry or set very quickly on account of the quick separation or evaporation of the volatile component, and the electrical dispersion of these solutions usually produces multiple threads or fibers of the fixed component, and these threads or fibers set or harden and dry with great rapidity. If the stream of the fluid discharged into the electrical field is continuous, the process of disruption of the fluid is also continuous, provided the electrical convective discharge is continuous, and hence by providing a continuous delivery of fluid into the path of a continuous electrical convective discharge the operation of the production of these fibers is continuous and the fibers may be collected mechanically—as, for instance, by reeling—as fast as they are produced. For the production of a field of convective discharge I employ any suitable source of high-tension or static electricity, such as a Holtz' static machine, induction-coils of large size, or the Tesla, Thomson, and other machines now well known for producing currents at enormously-high voltage. Many different varieties of composite fluids the fixed component of which is sufficiently tenacious and adhesive for the purpose possess the property of being converted into fiber under the effect of high-potential electrical discharges. Among the materials with which I have successfully operated for the making of fiber in this way are liquid glue, collodion, so-called "flexible" collodion, (ordinary collodion to which has been added five per cent. of Canada turpentine and three per cent. of castor-oil,) and a solution of pure rubber and sulfuric ether. Other materials may of course be used for the purpose.

In order that specific instances of the effective carrying out of the manufacture of artificial fiber based upon my discovery may be understood by those skilled in the art, I will describe several forms of apparatus which can be used for the purpose, reference being had to the accompanying drawings, forming a part of this specification, and in which—

Figure 1 represents diagrammatically the prime conductors of a suitable source of high-potential current, such as an influence-machine, showing a flexible support depending from the negative conductor and onto which fiber in a cobweb-like mass will be formed from material passing drop by drop or in a fine stream out of a containing vessel; Fig. 2, a similar view illustrating a modification consisting in conducting a branch from the positive conductor directly into the material from which the fiber is to be produced, whereby the flow of the same from the vessel will be facilitated, as in the well-known electrical fountain; Fig. 3, a similar view illustrating the formation of a single thread of fiber by producing the discharge from the material of which the fiber is to be formed directly to the negative conductor, the material in this case being caused to flow through a capillary tube; and Fig. 4, a view corresponding to Fig. 3, with the exception that the thread formed by the discharge is drawn to and wound upon a suitable reel, whereby a continuous thread will be produced.

In all of the above views corresponding parts are represented by the same numerals of reference.

1 represents the positive prime conductor, and 2 the negative prime conductor, of a suitable source of high-potential discharge, preferably an influence-machine of the Holtz type.

3 represents a suitable receptacle for containing the material which is to be converted into fiber, said receptacle being, preferably, a glass vessel suspended from an insulated support. In Figs. 1 and 2 the tubular bottom 4 of the receptacle is sufficiently large to permit a flow by gravity of the material through the same, said tubular bottom being provided with a stop-cock 5, by which the flow can be regulated and the material permitted to flow out in the form of drops or in a very fine stream. In Figs. 3 and 4 the bottom 6 of the receptacle is made in the form of a capillary tube, which may, if desired, (see Fig. 3) be provided with a similar stop-cock 5. When the lower end of the receptacle is made in the form of a capillary tube, a stop-cock is ordinarily not required, since the material will not flow out from such a tube except under the influence of the electric discharge, as in the ordinary electrical fountain.

In Fig. 1 I illustrate a chain 7, depending from the negative conductor for accumulating the fiber, and in Fig. 4 I illustrate a reel 8, upon which a single thread can be wound in any suitable way.

Referring first to the form of apparatus shown in Fig. 1, the operation will be as follows: The receptacle 3 is supplied with a suitable viscid or tenacious fluid-like material—for instance, liquid glue—and it is so supported with respect to the positive prime conductor that the material may flow out through the end 4 thereof in the form of drops, as shown, or as a very fine stream very close to the positive conductor or in actual contact therewith. The machine being started, the two conductors are arranged, preferably, to result in the formation between them of the well-known brush discharge. If the stop-cock 5 is now opened to permit the material to flow past or in contact with the positive prime conductor 1, the influence of the discharge causes the material to be instantly converted into fiber, which accumulates upon the negative prime conductor and upon the flexible support 7 in the form of a beautiful cobweb-like mass. These fibers ordinarily retain their identity, and in the case of material requiring subsequent drying they may be dried without difficulty. In the case of collodion and materials formed by the solution of a solid in a volatile fluid the effect of the discharge is to volatilize the solvent, and the resulting fibers when formed are sufficiently dry for use. In the case of extremely-viscid materials, like rubber dissolved in sulfuric ether, the fibers after they are formed if allowed to come into contact or unless properly treated quickly lose their identity and merge into a sponge-like mass, which may be put to any industrial use.

With the apparatus shown in Fig. 2 the operation is the same except that a part of the current is permitted to electrify the fluid, with the result that it passes more rapidly out of the containing vessel; but the formation of the material into fiber is exactly the same as with the apparatus shown in Fig. 1.

With the apparatus shown in Fig. 3 the negative conductor is so arranged with respect to the bore of the capillary tube 6 that a silent discharge will take place between them. This discharge causes the material to flow through the capillary tube, as in the well-known electrical fountain, and the material after leaving the tube will be formed into a single continuous thread, which tends to accumulate on the negative prime conductor. This thread may be wound up on a reel 8, as shown in Fig. 4, and in this way fibers of any desired length can be produced.

I find in practice that the establishment of the best brush discharge for the purpose is effected between small balls or roughened brass balls constituting the positive and negative conductors, respectively, although such discharge may be effected between points, as explained, or between the material to be fibrated and the negative conductor. If it is found in operation that the fiber tends to bridge the space between the positive and negative conductors to short-circuit the discharge, the fiber should be broken off from time to time at the positive conductor; but this result does not ordinarily take place and seems to be only an accidental occurrence in the process.

Although I have referred herein particularly to the formation of fiber on the negative conductor by transporting a fiber-producing substance from the positive prime conductor or from the immediate vicinity thereof, as occurs in the observed phenomena of cataphoresis, yet it will be understood that the transportation or carrying of the material and its formation into fiber may take place from the negative to the positive prime conductor, as in the phenomena of anaphoresis, when the fiber-producing materials, if used, are so transported. (See *Traité Theorique et Pratiqe D'Electrochimie*, by Tommasi, Paris, 1890, page 38, *et seq.*)

I am not able to state positively the reason for the operations above explained. It is well known that fluids may be transported by electric discharges from the positive to the negative pole, or vice versa, according to the nature of the fluid. It is also well known, as in the case of the electrical fountain, that the electrification of a fluid causes it to pass readily through a capillary tube through which it would not ordinarily flow, and this fact apparently explains the operation which takes place with apparatus of the type shown in Figs. 3 and 4. Furthermore, it is known that the effect of a convective brush or silent discharge upon drops of liquid is to cause them to coalesce, which fact may account for the conversion of the materials into fiber-like formation. Moreover, it was observed by Beccaria that an electrified fluid evaporated more rapidly than one which was not electrified, and I attribute to this phenomena the fact that in the production of fiber the drying and hardening thereof, particularly when a volatile solvent is used, takes place almost instantly. Furthermore, it is possible that the production of ozone in the discharge may operate to ozonize the material in process of formation or to ozonize the fiber the instant of its production, and, finally, since it has been observed that threads or fibers which are similarly electrified tend to repel each other it has seemed to me very probable that it is this fact which enables the individual fibers to retain their identity without again coalescing during the instant of time in which their permanent formation takes place.

I am unable to say whether the explanation which I have given is the correct one or not; but such an explanation appears to accord with the phenomena heretofore observed.

Having now described my invention, what I claim as new, and desire to secure by Letters Patent, is as follows:

1. The process of separating from composite fluids the volatile component and breaking up the fixed component thereof, which consists in delivering the fluid into the path of a convective discharge of high-tension electricity, disrupting the composite fluid, thereby evaporating the volatile component and simultaneously solidifying the fixed component, substantially as described.

2. The process of separating from composite fluids the volatile component and fibering the fixed component thereof, which consists in delivering the fluid in a viscous condition into the path of a convective discharge of high-tension electricity, breaking up or disrupting the viscous composite fluid thereby, and solidifying the fixed component into multiple fibers, substantially as described.

3. The process of separating from composite fluids the volatile component and fibering the fixed component thereof, which consists in delivering the fluid in a viscous condition into the path of a convective discharge of high-tension electricity, breaking up or disrupting the viscous composite fluid thereby, evaporating the volatile component, and simultaneously solidifying the fixed component into multiple fibers, substantially as described.

4. The process of separating the volatile liquid component from the component of fixed substances in composite fluids composed thereof, which consists in conducting a supply of composite fluid to a field of convective action of high-tension electricity, causing a delivery of the said composite fluid in a free and attenuated form therein, then disrupting the composite fluid thereby, and collecting the separated product of the fixed substances resulting from the disruptive action of the convective field upon the composite fluid, substantially as described.

5. The process of separating the volatile liquid component from the component of fixed substances in composite fluids composed thereof, which consists in conducting a supply of the composite fluid to a field of convective action of high-tension electricity, causing a delivery of the said composite fluid in a free and attenuated form therein, then disrupting the composite fluid thereby, simultaneously volatilizing the volatile liquid component and setting the component of fixed substances while in a filamentous condition, and collecting the separated filamentous products of the fixed substances, substantially as described.

6. The process of separating the volatile liquid component from the component of fixed substances in composite fluids composed thereof, which consists in conducting a supply of the composite fluid to a field of convective action of high-tension electricity, causing a delivery of the said fluid in a free and attenuated form therein, then disrupting the composite fluid thereby, simultaneously volatilizing the volatile liquid component and fibering the component of fixed substances into multiple fibers and causing the same to set while still in a fibrous condition, and collecting the fibrous products of the fixed substances, substantially as described.

This specification signed and witnessed this 11th day of January, 1900.

WILLIAM JAMES MORTON.

Witnesses:
  E. B. Treat,
  M. Reeves.